United States Patent [19] [11] 4,374,347
Müller [45] Feb. 15, 1983

[54] BRUSHLESS D-C MOTOR SYSTEM
[75] Inventor: Rolf Müller, St. Georgen, Fed. Rep. of Germany
[73] Assignee: Papst Motoren KG, St. Georgen, Fed. Rep. of Germany
[21] Appl. No.: 241,059
[22] Filed: Mar. 6, 1981
[30] Foreign Application Priority Data
Mar. 19, 1980 [DE] Fed. Rep. of Germany ....... 3010435
[51] Int. Cl.³ ............................................. H02K 29/02
[52] U.S. Cl. ..................................... 318/138; 318/254
[58] Field of Search ................... 318/138, 139, 254 A, 318/254, 345 C, 345 G, 439

[56] References Cited
U.S. PATENT DOCUMENTS
3,555,389 10/1968 Opal ................................. 318/345 G
3,845,379 10/1974 Kawamata et al. ............. 318/345 C
3,927,357 12/1975 Konrad .............................. 318/139
4,005,347 1/1977 Erdman .
4,030,005 6/1977 Doemen ............................. 318/138
4,099,104 7/1978 Muller ............................... 318/138

FOREIGN PATENT DOCUMENTS
1214771 4/1966 Fed. Rep. of Germany .
2000498 7/1971 Fed. Rep. of Germany .
2239167 2/1974 Fed. Rep. of Germany .
2527744 1/1976 Fed. Rep. of Germany .
950337 2/1964 United Kingdom .
1432192 5/1976 United Kingdom .
1528573 10/1978 United Kingdom .
1558686 1/1980 United Kingdom .
1590286 5/1981 United Kingdom .

Primary Examiner—J. V. Truhe
Assistant Examiner—S. M. Bergmann
Attorney, Agent, or Firm—Frishauf, Holtz, Goodman & Woodward

[57] ABSTRACT

To provide for efficient operation and recuperation of stored inductive energy in a pulse-operated motor, a preferably bifilar winding (20, 21; 20', 21') has its respective strands or filaments energized by complementary transistors (57, 58; 69, 75; 80, 81) which have reversely polarized free-wheeling diodes (59, 60; 80", 81") connected thereacross. A coupling capacity (47) is connected between the junctions of the respective transistors and the associated winding so that, upon turn-off of a transistor, as controlled by a rotor position sensor, such as a Hall generator (25), stored electromagnetic energy is coupled to flow through the free-wheeling diode of the transistor then to be connected, to be returned to a d-c source, such as a battery (34) or stored in a storage capacitor (45). The output signal from the rotor position sensor is in binary, high-low form, which can control the complementary transistors.

18 Claims, 11 Drawing Figures

FIG. 2 PRIOR ART
CONTROL SWITCHING CIRCUIT

BRUSHLESS D-C MOTOR SYSTEM

Reference to related patents and applications, assigned to the assignee of the present application:
U.S. Pat. No. 4,099,104, U.S. Pat. No. 3,840,761, German Patent DE-PS No. 23 46 380
German Patent Disclosure Document DE-OS No. 22 25 442
Article by the inventor hereof: "Zweipulsige kollektorlose Gleichstrommotoren" ("Two-pulse brushless d-c motors") in "asr-digest for applied motive technology", 1977, pp. 27 to 31, (issue 1-2).

The present invention relates to a brushless d-c motor system, and more particularly to a permanent magnet d-c motor which has field current applied thereto in pulses controlled by a semiconductor network in which the timing of the pulses with respect to rotation of the motor is commanded by a rotor position sensor, for example a galvanomagnetic sensor, typically a Hall generator.

BACKGROUND

Various types of brushless d-c motors have been proposed; they are usually supplied from a d-c network which may be derived from a battery of a vehicle, for example at 12 or 24 V, the battery of a telephone central station (48 or 60 V), or a low-voltage supply from a control panel. Usually, only a two-pole or two-terminal d-c network is available, that is, a network which has one ground, chassis, or reference terminal and an active terminal, usually the positive terminal. Two-terminal d-c networks limit the selection of circuits which can be used to drive d-c motors—see, in connection herewith, the article by the inventor hereof in the referenced "asr-digest", and especially FIGS. 1 to 6 thereof.

If a three-terminal d-c network is available, for example a 24 V network having a +12 V terminal, ground or chassis, and a −12 V terminal, then simple circuits can be used as shown, for example, in FIGS. 2 and 5 of the aforementioned literature reference. Few problems arise with induced voltages which occur when the windings of the motor are de-energized. It is, of course, possible to form a three-pole network artificially by connecting two capacitors in series across the network supply to provide an artificial zero or center terminal. The capacitors required, however, must be of substantial size. For a 25 V motor of 4 W power, two capacitors, each of 220 μF, 35 V, are needed. There is a danger of short circuit if, as may occur, both output transistors connecting the respective armature windings of the motor are energized simultaneously. Special protective circuitry is necessary to prevent switching overlaps of the output transistors.

A full-wave bridge circuit can be used with a two-terminal or pole d-c network. This is comparatively complex and requires many components, see FIG. 5 of the referenced literature. It is also possible to connect the motor in a star winding or a two-filamentary, two-pulse motor, with a center tapped winding, see FIG. 3 of the referenced literature. FIG. 6 illustrates a circuit for a four-pulse motor having four armature winding filaments which are star-connected.

A full-wave bridge circuit is efficient with respect to utilization of the wire or copper in the windings and also is capable of good recuperation of inductive energy which arises upon commutation of the windings. It requires, however, a considerable number of components in the electronics, and, there, components which are relatively expensive, for example four output transistors, circuitry for four control signals for the respective output transistors, of which two operate in push-pull. Circuitry is additionally needed to insure that the control signals are clearly temporally separated. If two transistors connected in series across the d-c network are controlled to conduct, even if only for a few microseconds, simultaneously, the resulting short-circuit current would destroy the transistors. Thus, reliability of motor operation requires substantial protective circuitry.

A center tapped winding—see FIG. 3 of the referenced literature—is frequently used in actual structures. Only two output transistors are needed, and the motor operates well with a two-terminal voltage source. There is no danger of short-circuit current even if both output transistors should have overlapping conduction times during short periods. Only the efficiency of operation is affected. It is difficult, however, to recuperate the energy released upon commutation and high voltage peaks may occur in the winding filaments which are disconnected. Such voltage peaks can be suppressed only with Zener diodes or with R/C networks, in which the R/C networks are less effective than the Zener diodes, although cheaper. Alternatively, it is possible to avoid such voltage peaks by soft or gradual disconnection or interruption of current flow through the armature windings; this, however, requires additional circuitry expense—see, for example, U.S. Pat. No. 4,099,104.

An improvement can be obtained—see U.S. Pat. No. 3,840,761, and particularly FIG. 20 thereof—by forming the filaments of the armature windings as dual or parallel filaments—see also FIG. 3 of the referenced literature. Making the windings as dual filaments, in which the filaments of the windings are positioned essentially in parallel, results in tight coupling of the two filaments of the windings. The voltage peaks are then avoided. It has been found, however, that such a motor has a disadvantage which is not immediately apparent: A square-wave voltage is applied over the entire length of both winding filaments with the full amplitude of the operating voltage, that is, in case of an operating voltage of the motor of 24 V, the square-wave voltage between the filaments will be about 48 V. By definition, a square-wave voltage has steep flanks. The relatively high voltages between the individual strands or filaments of the windings, and particularly the steep flanks of the voltage pulse, substantially stress the insulation of the winding and cause deterioration of the insulation as time progresses. Thus, this type of winding is restricted to operation with low operating voltages, that is, in the order of between 12 to 24 V, since operation with higher voltage places excessive stress on the insulation and impairs the reliability. If the motor is to operate under condition where reliability of operation is important, or with higher operating voltages, double-insulated wire is needed.

THE INVENTION

It is an object to provide a motor system which is suitable for operation from a two-terminal d-c network, which permits effective complete recuperation of inductively stored energy which arises in the armature windings upon termination of the operating pulses, which does not cause voltage peaks at the respectively disconnected winding filaments and which does not impair the integrity of the insulation of the winding filaments; and which, further, preferably is simple and permits use of semiconductor control elements which can be easily controlled so that the electronic portion of the motor system can be constructed in simple and inexpensive manner.

Briefly, power transistors, for example of the Darlington type, of respectively opposite conductivity are connected to respective winding filaments of the armature winding; one winding filament is connected with one terminal over a semiconductor, typically a Darlington transistor of a first conduction type, for example an npn transistor, and to one terminal of the d-c network; the other filament or strand of the armature winding is connected to the other terminal of the d-c network and with another terminal thereof to the output transistor of opposite conductivity type, for example a pnp Darlington transistor. A sensing element, for example a Hall sensor, or any other suitable rotor position sensor, is provided which has an output signal which is either "high" or "low", that is, is of the binary output type. The "high" and "low" signal can be referred to as a 1-signal or as a 0-signal, respectively. Conduction of the respective output transistors, which have their other terminal connected to the respectively opposite terminal of the d-c network to which the associated winding strand or filament is connected, are determined by the rotor position sensor signal, that is, whether the signal is a 1-signal or a 0-signal. Thus, alternatingly, the rotor position sensor controls conduction of the one or the other one of the output semiconductors. The transistors have reversely poled free-wheeling diodes connected thereacross.

Use of a dual-filament or dual-strand armature winding possibly also with a capacitor provides for effective tight coupling so that electromagnetic energy stored in the inductance of the winding which, upon disconnection of the winding, that is, blocking of the respectively connected output semiconductor, that is, the output transistor, can be effectively recuperated by coupling to the other one of the strands of the winding. Thus, no peak voltages will arise in the respective winding strands. No voltage differences will occur within the pairs of the strands or filaments of the windings which is greater than the operating voltage. Switching voltages which impair the effectiveness of the insulation between the windings likewise are avoided, since the two windings have, for all practical purposes, a d-c voltage thereacross which, even if the winding strands or filaments are positioned in parallel, is no greater than that of the operating voltage. Thus, even in parallel-wound operation, which has substantial advantages in manufacture, use and operating efficiency, the winding insulation is stressed only to the extent of the voltage of the supply network, thus insuring high life and reliability of the motor and motor system.

The tight ac-coupling of the two filaments of the winding provides for essentially complete feedback or recuperation of inductively stored energy in one of the strands, and suppression of voltage peaks. The energy which arises in the filament or strand which has its supply voltage disconnected is not fed back to the network or to a storage capacitor directly, but rather indirectly. The free-wheeling diode which is connected in reverse polarity with respect to, and across the control semiconductor, provides for current flow through the winding which is then just being connected. The invention, thus, provides for an energy bridge between the filament or strand which is just being disconnected, and the filament or strand which is then just being energized, which energy bridge transfers the inductively stored energy in one of the strands or windings to the other strand or winding, with essentially little loss and time delay, the energy being transferred to the other winding then being applied over the associated free-wheeling diode to the network or to a storage capacitor, respectively, so that voltage peaks are avoided while the overall efficiency of operation will be high. Transfer of energy thus occurs without danger to the insulation of the windings by high voltage peaks, and the system thus is a substantial advance over prior art structures.

An additional and important and unexpected advantage is obtained by the circuit. Use of semiconductor control elements of opposite conductivity type can be controlled by a single signal source providing 1-signals and 0-signals, alternatingly, so that the control of commutation or selection of application of pulses to the respective strands or filaments of the winding is simple, resulting in an overall inexpensive circuit.

DRAWINGS

FIG. 1b is a schematic diagram of the windings, that is, of the strands of the motor of FIG. 1a;

FIG. 4, collectively, is a highly schematic representation of a winding arrangement of parallel placed windings, in which

FIG. 5, collectively, shows a series of graphs of currents and voltages arising in the motor of FIG. 3, in which

Figure 1A:
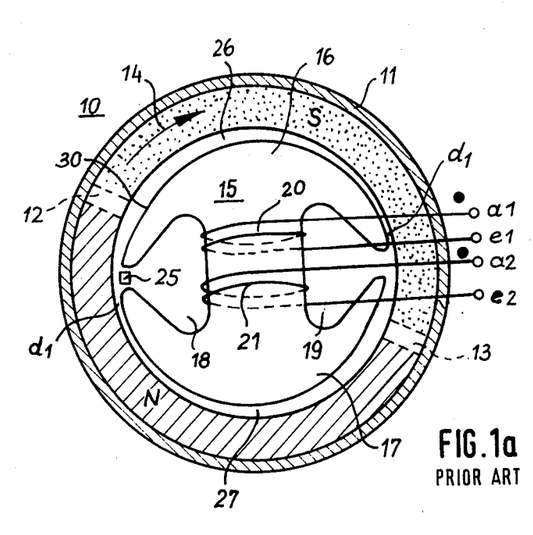
FIG. 1a is a highly schematic end view of a two-filament or two-strand, two-pulse energized external rotor motor in accordance with the prior art.

The basic motor, motor structure, and basic considerations: FIG. 1 shows an external rotor motor 10 having a two-pole rotor 11 formed as a continuous magnetic ring. Magnetization is approximately trapezoidal, so that the magnetic flux within the region of a pole is effectively constant. The gaps 12, 13 between the poles are narrow.

The positions of effectively constant magnetic flux for the North pole are indicated by cross-hatching; and for the South pole by stippling, in order to facilitate understanding of the principle of the present invention.

The rotor 11 is radially magnetized, that is, is a radially magnetized permanent magnet element made, for example of barium ferrite, or may be a rubber magnet. The two pole gaps 12, 13 are shown in broken lines. The rotor 11 is illustrated in FIG. 1 in one of its two stable quiescent positions which the motor may have when it is de-energized. This stable position is determined by the shape of the air gap and the magnetization of the rotor. The direction of rotation, in operation, is in accordance with the arrow 14.

Figure 1B:
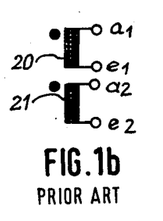

The stator 15 of motor 10 is a double T-stator having an upper pole 16 and a lower pole 17 which, both, are essentially umbrella or mushroom-shaped - in cross section, that is, each covers almost the entire pole arc. Slots 18, 19 are positioned between the ends of the pole shoes in which the two winding strands or filaments 20, 21 of a dual-filament winding are positioned. The terminals of the winding 20 are shown at a1 and e1, and the terminals of winding 21 are shown at a2 and e2—see also FIG. 1b. The windings 20, 21 have the same number of turns and are wound in the same direction, that is, if d-c flows from a1 to e1, then the same magnetization of the stator 15 will occur as when the same current flows from a2 to terminal e2. The dot notation, as is conventional, is shown in FIG. 1b, that is, winding 20 has its dot at terminal a1, winding 21 at terminal a2. A similar dot notation will be used in connection with the other figures.

A rotor position sensor 25 is located on the stator or in fixed relation thereto. As shown, the rotor position sensor 25 is a Hall device, for example a Hall integrated circuit, positioned at a predetermined angular position of the stator 15, which corresponds approximately to the slot 18. It is slightly offset with respect to the slot 18 counter the direction of rotation 14, that is, in counter-clockwise direction, by a few degrees. The Hall device 25 is controlled by the magnetic field of the permanent magnet 11 and provides a signal which depends on the position of the rotor. This signal is either "high" or "low" and, upon rotation of rotor 11, for all practical purposes provides a square-wave output, the "high" and "low" portions of which are each approximately 180°—e1.

The air gap 26 over the stator pole 16 and the air gap 27 over the stator pole 17, each, has a very specific shape. Starting from slot 18, and going in the direction of rotation 14, the air gap 26 increases approximately monotonically for an angle of about 10° to 15° to a maximum 30 at a first position. The air gap 26 then monotonically decreases over about 170° up to approximately the opening of the slot 19, where it reaches a minimum value d1. The air gap 27, as shown, is identical. The shape of the air gap, in combination with the particular type of magnetization of the rotor 11, in operation, causes generation of a reluctance torque of a predetermined temporal course as the rotor rotates, and as known (a complete description is found, for example, in German Pat. No. 2,346,380). Various different types of motors may be used, of course, rather than the motor described in FIG. 1. For example, a coreless axial air gap motor as described, for example, in U.S. Pat. No. 3,840,761, see particularly FIG. 20, can be used; or a four-pulse, four-filament motor as described in the aforementioned "asr-digest" literature reference, FIG. 6. The particular type of motor does not form a part of the present invention although a motor with a non-uniform air gap is preferred since the output torque will be more uniform throughout the rotation of the motor than with a uniform air gap motor.

Figure 2:
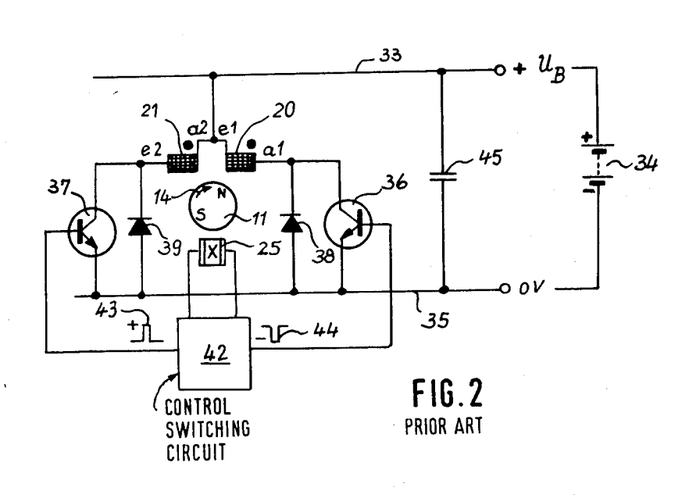
FIG. 2 is a schematic circuit diagram of a commutating circuit for the motor of FIG. 1a, in accordance with the prior art.

A customary circuit for the motor of FIG. 1 is shown in FIG. 2. A positive supply line 33 is connected to a positive operating voltage $U_B$, for example battery 34. The negative terminal 35 is connected to the negative terminal of the battery 34. Battery 34 may have, for example, 12, 24 or 48 V. Terminals e1 and a2 of the two respective winding filaments or strands 20, 21 are connected to the positive line 33, terminals a1 and e2 are connected to the collectors of two npn transistors 36, 37, the emitters of which are connected to the negative bus 35. Each one of the transistors 36, 37 has a free-wheeling diode 38, 39, respectively, connected thereacross. The rotor position sensor 25 controls a controlled switching circuit 42 having two outputs, connected respectively to the base terminals of the transistors 36, 37. When transistor 37 receives a positive signal 43, the transistor 37 is energized and current will flow through the winding strand or filament 21. At the same time, transistor 36 must receive a negative signal 44 to cause transistor 36 to block. Conversely, when transistor 36 conducts, transistor 37 must block. Thus, oppositely poled signals 43, 44 are necessary, which renders the construction of circuit 42 quite complex, particularly if the currents in the respective filaments 20, 21 are to be disconnected gradually to prevent occurrence of switch-off voltage peaks. If gradual or soft disconnection of current is not possible, the diodes 38, 39 must be formed as Zener diodes, resulting in comparatively high radio noise interference which, in many instances, is undesirable, and for some applications is not permissible. A storage capacitor 45 can be used to at least partially suppress stray interference.

Figure 3:
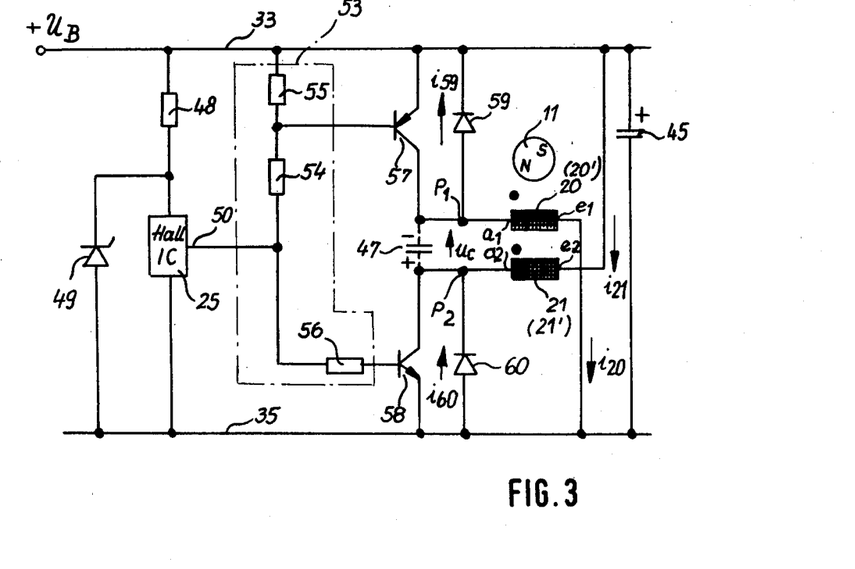
FIG. 3 is a circuit diagram of a motor and control system in accordance with the first embodiment of the invention.

In accordance with the present invention, and as illustrated in FIG. 3, the windings are coupled, either by a capacitor or inductively, and reversely polarized diodes are provided in parallel with the control to couple energy released upon blocking of a respective transistor into the other winding and permit current flow then through the diode connected to the other winding.

Figures 4A, 4B:
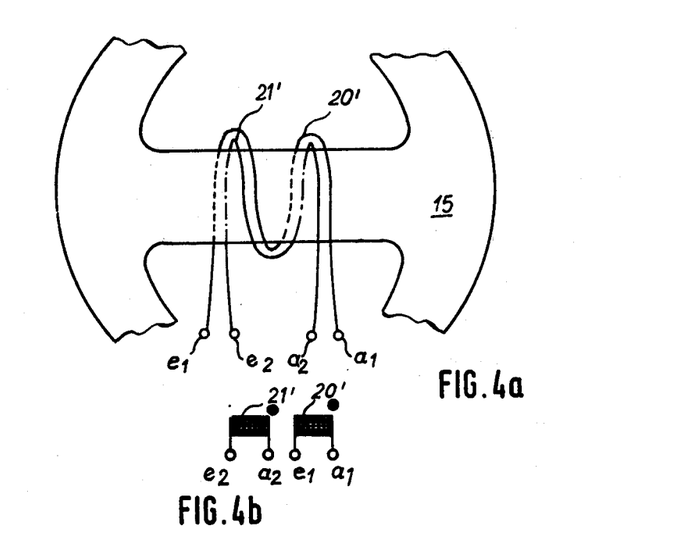
FIG. 4a is a representation of the winding.
FIG. 4b is the equivalent circuit representation utilizing the conventional dot notation.

The circuit diagram of FIG. 3 is illustrative of two embodiments of the invention which, from a consideration of the diagram alone, are not separately apparent. One of the embodiments, as illustrated in FIG. 3, utilizes two windings 20, 21 which are wound in parallel—as illustrated in FIG. 4. Coupling between the windings in inductive. If the windings 20, 21 are not inductively coupled, or only slightly so, for example if the motor has a coreless stator winding as described, for example, in applicants' U.S. Pat. No. 3,840,761, FIG. 1, a coupling capacitor 47 is needed. The size of the coupling capacitor 47—which may be entirely absent—effective capacity zero or close thereto—will depend on the coupling of the windings. The capacitor 47, thus, may be absent, of very small capacity, or of sufficiently large capacity to effect coupling of the inductive energy which is stored in the winding filament then carrying current into the winding which is to be connected. The coupling capacitor 47 can function also as an energy storage element, so that the capacity of the capacitor 45 then need only be in the order of nF and will be used only to suppress radio noise interference on the connection buses 33, 35.

In the description to follow, components once desired and functioning similarly in other embodiments, or in accordance with the prior art, have been given the same numerals and will be described only once herein.

Embodiment of FIG. 3 with capacitative coupling, capacitor 47: The Hall IC 25 has one terminal conected to the chassis or ground bus 35 and the other over a resistor 48 to the positive $U_B$ bus 33. A Zener diode 49 is connected in parallel to the Hall generator 25 to control its operating voltage to a suitable design value, for example to 5 V. The output 50 of the Hall generator 25 is connected to a resistance network 53 including three resistors 54, 55, 56 which are serially connected. The output 50 of the Hall IC is connected to the junction between resistors 54, 56. The other terminal of resistor 56 is connected to the base of an npn transistor 58; resistor 55 is connected to the bus 33, and its other terminal to a junction with the free terminal of resistor 54. This junction is connected to the base of a pnp transistor 57 which, hence, is complementary to transistor 58. The emitters of the transistors 57, 58 are connected to the respective buses 33, 35. The collectors of the transistors 57, 58 are connected to the dot terminals of the windings 20, 21, that is, to terminals a1, a2. A free-wheeling diode 59 is connected between the terminal a1, that is, the collector of transistor 57, and bus 33; a free-wheeling diode is connected between the winding terminal a2, that is, the collector of transistor 58, and bus 35. The polarity of current flow through the diode 60 is opposite that of the transistors 57, 58 when the transistors are conducting. Connection of the diodes 59, 60 with respect to the transistors, in view of the polarity of conduction, is also termed an anti-parallel connection.

In accordance with a feature of the invention, the windings 20, 21 are coupled by a coupling capacity 47. As shown, a coupling capacitor is provided. In accordance with a feature of the invention, the capacitor 47 is so dimensioned that it can receive at least a portion of the inductive energy stored in the winding filaments 20, 21 without substantial increase of its charge voltage $u_c$, that is, does not essentially exceed the line voltage between the buses 33, 35.

The terminals a1, e1; a2, e2 are similar to and have been given the same notation as in FIG. 1. Voltage levels at the terminals a1, a2 are indicated as p1, p2; currents and other voltages shown in FIG. 3 are similarly identified in FIG. 5A to FIG. 5C.

Figure 5A:
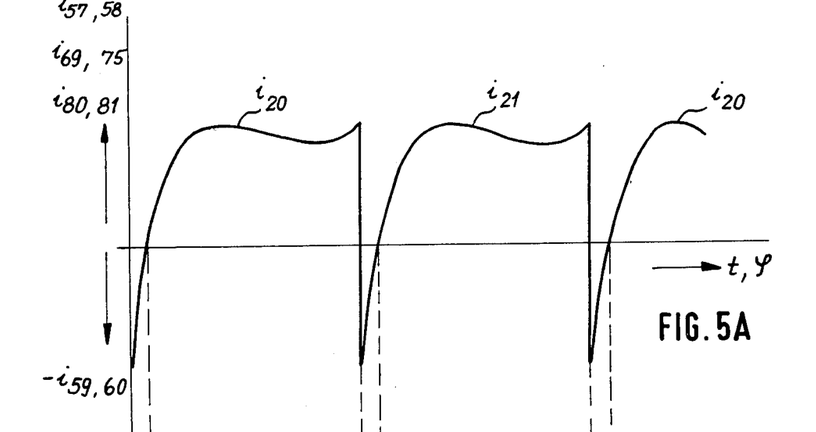
FIG. 5A is a time-current graph.
Figure 5B:
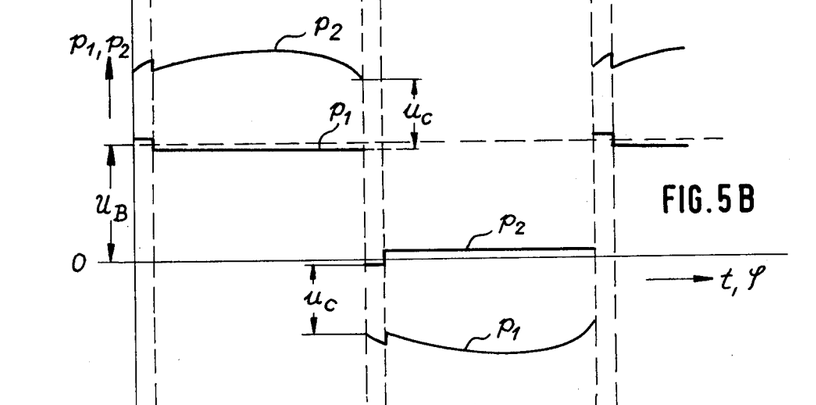
FIG. 5B a time-voltage diagram, and 5C a time-pulse current diagram.
Figure 5C:
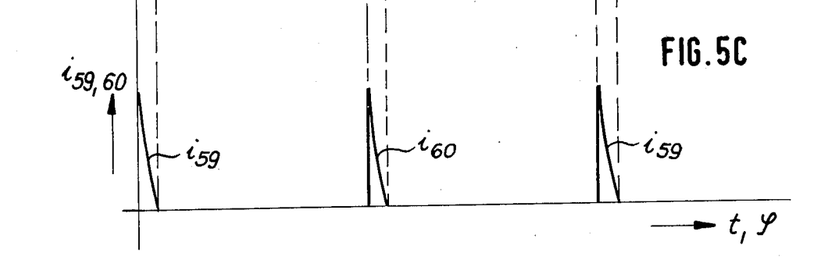

Operation, with reference to FIGS. 5A–5C: Let it be assumed that the transistor 57 is controlled to conduction. A current $i_{20}$ will flow from bus 33 through the current carrying conduction path of transistor 57 and winding 20 from terminal a1 to terminal e1. The stator pole 16 becomes a South pole, and the stator pole 17 a North pole. If the transistor 58 is rendered conductive, a current $i_{21}$ will flow from terminal e2 to terminal a2, the stator 16 becomes a North pole and the stator 17 a South pole. In the rotor position illustrated in FIG. 1, in which the Hall generator 25 is opposite a North pole of the rotor 11, transistor 57 is controlled to conduction, and hence winding 20 will have current flowing therethrough; when the Hall-IC 25 is opposite a South pole, the winding filament or strand 21 is rendered to conduction, thus resulting in the direction of rotation indicated by arrow 14—FIG. 1a. When the Hall generator, thus, is opposite a North pole, its output 50 will be at a low value or, in binary notation, a zero level. This terminal, then, will have approximately the voltage of the negative or chassis or ground bus 35, transistor 58 will block, and transistor 57 will become conductive. Conversely, when a South pole is opposite the Hall generator 25, the output 50 will become high, or a 1-signal, or positive; transistor 58 becomes conductive, and transistor 57 blocks. Thus, one single output signal at the output 50 from the Hall generator permits control of the two transistors 57, 58 in push-pull, or alternate conduction, or in counter phase by control over the resistance network 53. The control switching circuit 42 of FIG. 2, thus, in accordance with a feature of the invention, merely becomes a three-resistor resistance network.

Commutation: Let it be assumed that transistor 58 is conducting and current flows through winding 21. Upon the next current pulse, transistor 58 should block; current during the next pulse should then flow through winding strand 20 upon conduction of transistor 57. When transistor 58 is conductive, the capacitor 47 will have a voltage $u_c$ thereacross with the polarity as shown in FIG. 3, and which is approximately equal to the average amplitude of the voltage which is induced by rotation of the permanent magnet rotor 11 in the winding strands 20, 21. This voltage is shown in FIG. 5B. The voltage across terminals e1, e2 differs continuously by the value of the network or supply voltage $U_B$, since the terminals e1, e2 are connected to the busses 33, 35.

Upon commutation, that is, upon turn-OFF of the transistor 58, the current $i_{21}$ in winding 21 begins to reduce. The voltage $P_2$ at the terminal a2 (FIGS. 3, 5B) will begin to rise until it is more positive by about the value $u_c$ than the voltage $U_B$ of the positive bus 33—see FIG. 5B. At this instant of time, the voltage p1 at the terminal a1 has risen approximately to the value of the supply voltage $U_B$, see again FIG. 5B, due to the coupling of the terminals a1 and a2 by the capacitor 47. As soon as the voltage across capacitor 47 slightly exceeds the voltage $U_B$, for example by more than 0.6 V, the free-wheeling diode 59 will become conductive and a current $i_{59}$ will flow to the storage capacitor 45 or will be returned to the power supply network—see FIG. 5C, so that the inductive energy from the winding strand 21 is recuperated over the energy bridge formed by the coupling of the winding 21 with the free-wheeling diode 59, in this instance via the capacity 47. Conduction of diode 59 prevents a further rise of the voltage $p_1$ and hence—due to the tight a-c coupling between the terminals a1 and a2 by the capacitor 47—a further increase of the voltage $p_2$ above a value which substantially exceeds $U_B + u_c$—see FIG. 5B. The currents through the respective winding filaments or strands 20, 21 are shown in FIG. 5A, and the voltage relationships at the respective terminals at FIG. 5B.

In accordance with the present invention, therefore, energy is transferred from the winding to be disconnected or turned OFF, in the example given winding strand 21, via the coupling capacity 47 and diode 59 to the source of the network supply, for example battery 34 (FIG. 1) or the storage capacitor 45. The capacitor 47 clamps the voltages of the terminals a1 and a2: when the voltage p1 rises, the voltage p2 likewise rises, and between the terminals a1, a2, that is, the voltages p1, p2, will have thereacross only an essentially uniform, unvarying voltage, namely that voltage across the capacity 47; the terminals e2 and e1 will have only the uniform and essentially unvarying operating voltage $U_B$. Thus, the insulation of the wires of the winding strands or filaments 20, 21 is stressed only with the d-c voltage or the network, which is moderate, and is not overloaded with excessive voltages.

Embodiment of FIG. 3—inductive coupling: If the winding filaments or strands 20, 21 are coupled by a ferromagnetic core analogous to a transformer, then a portion of the energy stored in the winding strand or filament which is de-energized is transferred to the other winding strand, and the other winding strand or filament then can transfer this energy to the free-wheeling diode 59. In the foregoing example, that is, when winding 21 is to be disconnected—transistor 58, after conduction, being turned OFF—energy is transferred to winding 20 which then causes current flow through the diode 59, as before. Two energy bridges are then provided, one over the coupling capacitor 47 and the other over the transformer or inductive coupling between the filaments or winding strands 20, 21. The capacity value of the coupling capacitor 47 thus should be matched to the transformer coupling between the winding strands 20, 21. If the coupling between the windings is very small, for example if the motor is a flat or "pancake" motor as illustrated in the aforementioned U.S. Pat. No. 3,840,761, FIG. 20 or FIG. 1, then the coupling capacitor 47 must have substantial capacity; if the motor is as shown in accordance with FIG. 1 of the present application, a much smaller coupling capacitor 47 can be used. If the coupling between the two filaments 20, 21 by parallel winding of the two filaments 20', 21'—FIG. 4b—is tight, it is possible to entirely eliminate the coupling capacitor 47 since this tight coupling can be a sufficient and simple energy bridge. Of course, some capacity between the windings will also be present and additionally contribute to the coupling, and this capacity may be represented also by an equivalent small capacitor 47.

In accordance with a feature of the invention, the winding strands 20', 21' are wound as bifilar, that is, two-wire parallel windings. It is not sufficient to merely wind two separate windings in common slots in order to obtain sufficient transformer coupling of the windings and thus avoid the necessity of the capacitor 47. The distance between the filaments in a winding arrangement in which windings are merely placed in common slots renders coupling between the individual winding strands or filaments incomplete. When the windings are wound on the armature as shown, for example, in FIG. 1a, incomplete inductive coupling between the windings will result. Consequently, and when using the circuit of FIG. 2 with the winding arrangement of FIG. 1a, the energy transfer, particularly upon rapid switching, is insufficient, and voltage peaks will occur in the winding filament which is turned OFF. If, however, in accordance with a feature of the invention, the winding filaments are wound commonly as a bifilar winding, so that the filaments are intimately mixed together, leakage flux is practically entirely suppressed. The spatial difference between winding strands in the arrangement of FIG. 1a results in somewhat loose inductive coupling. In contrast, and when using the winding arrangement shown in FIG. 4a, in which the bifilar windings are intimately mixed, the inductive coupling is tight and effective, thus practically entirely suppressing leakage flux.

It has been found, surprisingly, that using a bifilar winding in combination with the circuit of FIG. 3 results in a difference voltage which is essentially a direct voltage between the two winding filaments 20', 21', the value of which at the winding ends e1, e2, connected to the buses 35, 33, is equal to the operating voltage $U_B$, and the value of which at the winding terminals a1, a2 corresponds roughly to the amplitude of the voltage which is induced by the rotating permanent magnet motor in the respective winding strands in operation of the motor. This voltage has a small alternating voltage modulated or superposed thereon. The amplitude of this induced voltage is approximately 50% to 70% of the operating voltage. The small alternating voltage can be suppressed by use of the coupling capacitor 47 connected between the collectors of the transistors 57, 58 or, at least with respect to the steepness of the flanks, sufficiently smoothed out, so that there is little danger of damage to the insulation due to voltage degradation. The insulation is not stressed by a square-wave voltage of substantial amplitude with steep switching flanks.

Due to the symmetry of the circuit, induced energy is transferred from the winding filament or strand 20 or 20' to the diode 60 in exactly analog manner, compare FIG. 5B. Energy stored in the winding 20 or 20', upon de-energization of the transistor 57, is transferred through the coupling capacitor 47 and/or transformer, inductive coupling of the windings to flow as current through the diode 60 to the power supply source of the network, e.g. a battery 34 (FIG. 1) or to the storage capacitor 45.

In one operating example arranged for 24 V, and for a motor with 4 W power input operating at 3000 rpm, a circuit of FIG. 3 with a motor wound in accordance with FIG. 1—that is, two separately arranged windings for the filaments 20, 21—has the following values:

Zener diode 49: 5.1 V
Hall IC 25: TL 170
resistor 54: 2.2 k$\Omega$
resistor 55: 100 $\Omega$
resistor 56: 5.1 k$\Omega$
resistor 48: 3.3 k$\Omega$
capacitors 45 and 47: 22 $\mu$F
transistor 57: BD 136
transistor 58: BD 135
diodes 59, 60: 1N4148.

As can be seen from the foregoing example, the components which are used can readily be accommodated on a printed circuit (PC) board. This is particularly important when the circuit is to be combined with fans or ventilators for electronic equipment of compact axial dimension, which is particularly important in fans or ventilator motors in combination with electrical and electronic equipment since very little space is available for the ventilator motor itself.

The circuit has the advantage that the transistors 57, 58 can be controlled to conduction and blocking with essentially square-wave signals, having the same phase position with respect to each other, but differing in d-c voltage level. The control signals for the transistors 57, 58 can thus be generated by a single output from a Hall integrated circuit (IC) generator without requiring an additional phase inversion stage. As illustrated in FIG. 3, a single output signal from the Hall IC 25 and a suitably dimensioned resistor network 54, 55, 56 provides for control of the two transistors in alternating conduction cycles. The control network for the transistors thus is simple and inexpensive.

Figure 6:
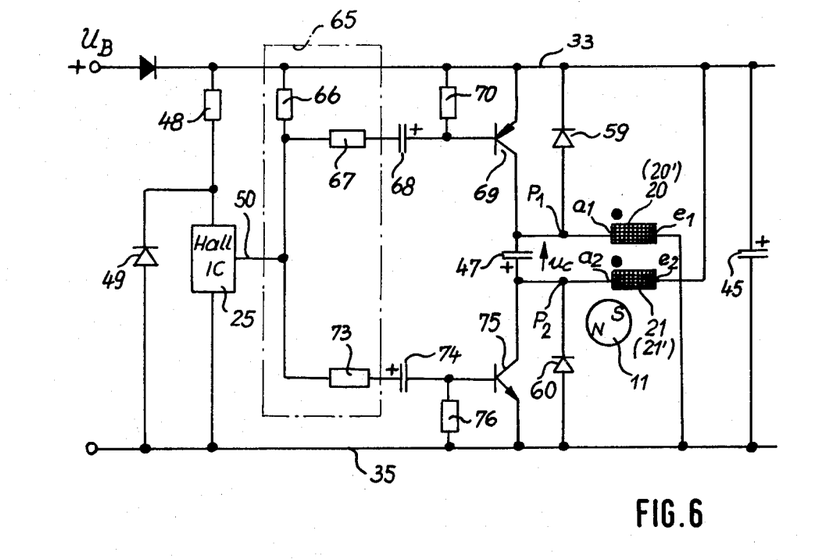
FIG. 6 illustrates the circuit system in accordance with a second embodiment of the invention.
Figure 7:
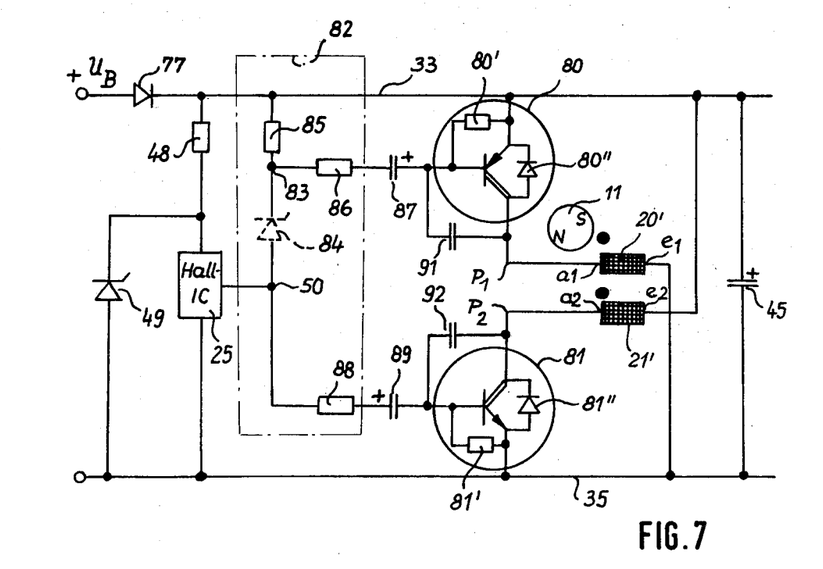
FIG. 7 is a circuit diagram of the preferred form of the system of the present invention using Darlington transistors.

As can be see, the arrangement of FIG. 3 provides for galvanic connection of the bases of the transistors 57, 58 via the resistors 54, 56. In accordance with a feature of the invention, additional advantages can be obtained by decoupling the bases of the transistors 57, 58 galvanically. Separating the d-c voltages on the bases of the output transistors is illustrated in the circuits of FIGS. 6 and 7. Similarly operating components previously described have been given the same reference numerals and will not be described again. The Hall generator or Hall IC 25 is connected as illustrated in, and described in connection with, FIG. 3.

Embodiment of FIG. 6: A coupling network 65 is provided connected to the output 50 of the Hall IC 25. Coupling network 65 has three resistors 66, 67, 73. Resistor 66 has one terminal connected to the positive bus 65; its other terminal is connected to the output of the Hall IC 25 and to one terminal of a resistor 67, which has its other terminal connected to a capacitor 68, the other terminal of which is connected to the base of a pnp transistor 69. A base-emitter resistor 70 connects the base 69 to the +$U_B$ bus 33, to which also the emitter of transistor 69 is connected. The output of the Hall IC 50 is further connected to resistor 73, the other terminal of which is connected to a capacitor 74 which is connected to the base of an npn transistor 75, having a base-emitter resistor 76 connected to negative or chassis or ground bus 35, to which also the emitter of transistor 75 is connected. The collector of transistor 69 is connected with the terminal a1 of the winding filament 20 (FIG. 1) or 20' (FIG. 4); the collector of the transistor 75 is connected with the terminal a2 of the winding 21, 21', respectively. Free-wheeling diodes 59, 60 are connected, as in FIG. 3, anti-parallel to the respectively associated transistors 69, 75. A coupling capacitor 47 is connected between the terminals a1, a2 of the winding filaments 20, 20', 21, 21'.

Operation

Let it be assumed that a North pole is opposite the Hall IC 25, as seen in FIG. 1. Its output voltage is a O-signal, thus is approximately at the line voltage of bus 35. Charge current will flow over the emitter-base path of the transistor 69 to capacitor 68 and will charge capacitor 68 in accordance with the polarity as shown in FIG. 6, causing transistor 69 to become conductive so that current will flow in the filament 20, 20', respectively. Upon turn-OFF of transistor 69, and current flow through the winding strand or filament 20, 20', respectively, energy is transferred from the respective winding strand 20, 20' via transformer coupling and the coupling capacitor to result in current flow through the diode 60 for recuperation or energy retrieval. Subsequently, transistor 75 will be controlled to conduction. At this time, capacitor 68 will discharge at least partially through resistors 66, 67, 70. The operation with respect to transistor 75 and capacitor 74 will be analogous. Resistors 70, 76 also draw off leakage currents which might arise in the capacitors 68, 74. In operation, both capacitors continuously receive a charge which varies due to the above-described charge-discharge cycles, resulting, however, in an essentially uniform voltage on the capacitors of a few volts, for example. The capacitors, thus, in operation function almost similar to small batteries which insure that the transistors 69, 75 safely block; as seen, capacitor 74 is charged with opposite polarity to that of capacitor 68.

In accordance with a feature of the invention, the circuit prevents excessive current draw in case of motor malfunction or interference with rotation of the motor. If rotor 11 blocks, the transistor which then conducts will receive current for only such a period of time until the associated capacitor 68 or 74 is fully charged. Thereafter, the transistor and with it the motor 10 will lose current. This is an additional advantage of this circuit arrangement. Diode 77 in the positive supply bus 65 is provided as a reverse-polarity protection diode to prevent damage to the circuit components upon inadvertent erroneous polarity of connection of the circuit to a battery or other source.

In an operating example, the following circuit values are suitable, for use with a 24 V operating voltage and a motor of 4 W input power, operating at 3000 rpm:

Resistor 48: 3.3 kΩ resistor 66: 1.2 kΩ
resistors 67, 73: 5.1 kΩ
resistors 70, 76: 22 kΩ
capacitors 68, 74, 45: 15 μF
capacitor 47: 10 μF.

Zener diode 49, Hall generator 25, the transistors and diodes were identical to those used in the circuit of FIG. 3.

The capacitors 68, 74, in the above example of 15 μF, have substantial size, and the size of the capacitors may be undesirable for certain applications. FIG. 7 illustrates an arrangement in which substantially smaller equivalent capacitors can be used. The motor is designed to be wound in bifilar windings, as described in connection with FIG. 4, that is, parallel-positioned wires wound together. No coupling capacitor 47, or a coupling capacitor of only very small value, is needed to be for connection between the terminals a1 and a2 of the respective winding filaments 20', 21'.

Embodiment of FIG. 7: Complementary Darlington transistors 80, 81 are used rather than ordinary transistors 57, 58; 69, 75 (FIGS. 3, 6). The type of Darlington transistor which is preferred is a type which already includes the emitter resistor 80' and an anti-parallel connected diode 80" in the same transistor housing and connected as shown in FIG. 7. Similar complementary components are used in the Darlington transistor unit 81, that is, a base resistor 81 and a free-wheeling diode 81". The Darlington transistors have substantially higher current amplification than the simple transistors 57, 58; 69, 75 and thus they can be controlled by R/C circuits of higher impedance.

The resistance network 82 forming the control switching circuit connected to the Hall IC 25 is similarly constructed, in general principle, as the network 65, 56. The output 50 from the Hall IC 25 forms a junction connected to resistors 88 and a junction 83 of resistors 85, 86. A Zener diode 84 may be connected between junction 50 and junction 83. This Zener diode is used if the operating voltage $U_B$ is, for example, more than 30 V. If the operating voltage $U_B$ is, for example, 60 V, a Zener diode 84 having a Zener voltage of 30 V is used in order to protect the Hall IC 25 at its output 50 against excessive voltage levels. If the operating voltage $U_B$ is less than about 30 V, for example 24 V, then the Zener diode 84 is not needed; if the operating voltages of the circuits of FIG. 3 or 6 exceed 30 V, and are for example 48 or 60 V, then a Zener diode similar to that of diode 84 should be used in the connection between the output terminal 50 of the Hall IC 25 and a coupling resistor which, directly or indirectly, is connected to the positive supply bus 33.

Junction 83—FIG. 7—is connected by resistor 85 to positive bus 33 and further by resistor 86 with a serial capacitor 87 which in turn is connected to the base of the Darlington transistor unit 80. The junction 50 is, further, connected through coupling resistor 88 to the capacitor 89 and then to the base terminal of the Darlington transistor unit 81. As can be seen, the Darlington transistor units 80, 81 are complementary. A small capacitor 91, 92 is connected across the base-collector terminal of the respective Darlington transistor unit 80, 81 in a Miller circuit to suppress high-frequency interference. The emitter of the pnp Darlington transistor unit 80 is connected to positive bus 33, its collector to the terminal a1 of the winding filament 20'. The emitter of the npn Darlington transistor unit 81 is connected to the ground or chassis or negative bus 35, and its collector to the terminal a2 of the winding filament or strand 21'.

Operation: Basically, the operation is identiacl to that of FIG. 6. Capacitors 87, 89, in operation, are charged to the polarity shown in FIG. 6 and function as small batteries which insure reliable blocking of the transistors 80, 81 and, further, insure rapid current disconnection if the rotor 11 of the motor should be blocked.

Suitable values of circuit elements for a 24 V, 3000 rpm, 4 W motor in the circuit of FIG. 7 are:

Zener diode 84: not necessary
resistor 85: 3.3kΩ
resistors 86, 88: 10 kΩ
capacitors 87, 89: 4.7 μF
capacitors 91, 92: 100. . . 220 pF
transistor 80: BD 678
transistor 81: BD 677.

All other circuit components are similar to those of FIG. 6, and the example has been selected with the same operating voltage to illustrate the comparison of circuit values. The Zener diode 84 is not needed since the operating voltage is below 30 V.

Comparison of circuit values of the circuits of FIGS. 6 and 7 shows that when using the bifilar winding— which is the preferred embodiment—only few and small electronic and electrical circuit components are used. The circuit of FIG. 7, thus, is the preferred and optimal embodiment.

The amplitude of the square-wave voltage between the winding strands when using the prior art circuit of the aforementioned referenced U.S. Pat. No. 3,840,761, particularly FIG. 20, is between about 36 to 44 V, with 24 V operating voltage.

The amplitude of the square-wave voltage when using the circuit of the present invention between the respective strands or filaments of the windings, with otherwise equal operating conditions, is between 12 to 24 V, with a small a-c component of 2 to 5 V superposed or modulated thereon. Such a difference voltage can be easily accepted by insulation normally applied to the wires. High-frequency a-c components are completely eliminated. Thus, damage or dagradation of insulation over long operating periods of time need not be feared, and a motor system is provided which has extreme reliability and long operating life with a simple associated control circuit using only few and readily available circuit components.

Motors with four or six filaments or strands can be used; the control circuit is then either doubled or tripled, and appropriate sensing elements, that is, rotor position sensors such as for example Hall generators are suitably positioned to be affected by the magnetic field of the rotor, for example at the circumference of the stator. In a four-pulse motor, Hall generators must be offset by 90°-el.-as well known in the field.

The dot convention of the designation of the windings utilized is this: Upon rotation of a motor with a permenent magnet rotor, voltages are induced in the windings which are of equal phase. For example: Let it be assumed that the two winding filaments with terminals a1-e1 and a2-e2, respectively, have a voltage induced which, at the same instant of time, is positive at the terminals a1 and a2 (so that a negative voltage will appear at terminals e1 and e2). Under those conditions, the connection points a1 and a2 each have a dot applied.

The dot, thus, indicates that the respective end of the winding within the motor system is subject to the same effect or has the same voltage polarity.

The embodiment of FIG. 7 permits operation without a coupling capacitor 47, as shown, or with a coupling capacitor 47 of only very small value. This has the additional further advantage that short-time simultaneous overlap of current through the transistors 80, 81 will not cause damage thereto; any overlap, in time, of current flow or conduction of both trnsistors 69, 75 in the circuit of FIG. 6 would, effectively, connect the charged capacitors 45, 47 in series, resulting in destruction of the transistors 69, 75. Immunity against spurious malfunction in the operation of the controlled elements 69, 75, 80, 81, or the respective control circuits therefor is another advantage of the circuit of FIG. 7.

Various changes and modifications may be made, and features described in connection with any one of the embodiments may be used with any of the others, within the scope of the inventive concept.

I claim:

1. Two-pulse, two-filament brushless d-c motor system having
a stator (15); d-c current supply means having two terminals (33,35);
a permanent magnet rotor (11);
rotor position sensing means (25) providing an output signal positioned on the stator and sensing a predetermined orientation of a magnet pole of the rotor with respect to the stator;
armature winding means including two winding strands or filaments (20, 21; 20', 21') wound on the stator, said winding strands or filaments being inductively coupled;
and control circuit means (42) including controlled semiconductor switch means (57, 58; 69, 75; 80, 81) connected to said winding strands or filaments to control pulsed current flow, alternately, through the respective winding strands or filaments,
wherein,
said semiconductor switch means are of respectively opposite, complementary conduction characteristics (pnp: 57, 69, 80; npn: 58, 75, 81);
one terminal (a2) of one winding strand or filament (21, 21') being connected through the main current carrying path of one of said semiconductor switch means (npn: 58, 75, 81) with one terminal (35) of the current supply means;
a similarly acting terminal (a1) of the other winding strand or filament (20, 20') being connected through the main current carrying path of the other, complementary semiconductor switch means (pnp: 57, 69, 80) to the other terminal (33) of the current supply means;
the other terminal (e1) of said one winding strand or filament (21, 21') being connected with the other terminal (35) of the current supply means;
the other terminal (e2) of said other winding strand or filament (20, 20') being connected with said one terminal (33) of the current supply means;
said one inding strand or filament (21, 21') and said other winding strand or filament (20, 20') being tightly a-c coupled together at least at the terminal end portions thereof connected to the respective controlled semiconductor switch means;
wherein, further, said control circuit means includes output connection means (50) and coupling circuit means (53; 65, 68, 74; 82, 87, 89) connecting output signals from the rotor position sensor means to the control terminal of said complementary controlled semiconductor switch means for alternatingly controlling conduction of the respective switch means to cause pulsed current flow through the respective winding strand or filament from said current supply means, and wherein unilateral conduction means (59, 60; 80, 81") are provided, respectively connected across the controlled semiconductor switch mens (57, 59, 80; 58, 75, 81) and polarized reversely with respect to said semiconductor switch means to recapture inductive energy stored in the respective winding strands or filaments upon turn-off of current flow therethrough during commutation by the pulsed current flow as controlled by said controlled semiconductor switch means.

2. System according to claim 1, wherein said coupling circuit means (53, 65, 82) comprises a resistance network connected to one of the terminals (33) of the current supply means and to said output connection means (50) of the rotor position sensing means.

3. System according to claim 2, wherein (FIGS. 6, 7) said coupling circuit means (65, 82) further includes a coupling capacitor (68, 74; 87, 89) connected in advance of the control terminals of the complementary controlled semiconductor switch means to block application of continued d-c voltages;

and discharge resistors (70, 76; 80, 81') connected to discharge said coupling capacitors.

4. System according to claim 3, wherein said coupling capacitors have capacity value in the order of several μF.

5. System according to claim 2, wherein the rotor position sensing means (25) comprises a Hall IC (25) directly connected to one terminal (35) of the current supply means;

and wherein the resistance network includes a first resistor (56, 73, 88) connecting the output connection means (50) to the control terminal of one (58, 75, 81) of the complementary controlled semiconductor switch means;

a second resistor (54, 67, 86) connecting the output connection means (50) to the control input of the other complementary semiconductor switch means (57, 69, 80);

and a coupling resistor connecting said output connection means to the other terminal (33) of said current supply means.

6. System according to claim 5, further including a constant voltage, voltage limiting element (84) connected between the output connection means (50) of the Hall generator (25) and the second and third resistor, respectively, to protect the output of the Hall generator with respect to high operating voltages applied across the current supply means (33, 35).

7. System according to claim 5, further including (FIGS. 6, 7) a coupling capacitor (68, 74; 87, 89) serially connected with the first and second resistor (73, 88; 67, 86) respectively.

8. System according to claim 7, wherein the respective coupling capacitor (74, 89; 68, 87) is connected in series with the respective resistor (73, 88; 67, 86) and the control terminal of the respective controlled semiconductor switch means.

9. System according to claim 1, wherein the complementary semiconductor switch means comprises complementary transistors.

10. System according to claim 1, wherein (FIG. 7) the complementary semiconductor switch means comprises complementary Darlington transistors (80, 81).

11. System according to claim 1, wherein the strands or filaments (20', 21') of the windings have tight inductive transformer-type couplings.

12. System according to claim 11, wherein (FIG. 4) the strands or filaments of the windings are wound as bifilar windings.

13. System according to claim 1, further comprising a coupling capacitor (47) connected between the said one terminals (a1, a2) of the respective winding strands or filaments (20, 20'; 21, 21') at the terminals thereof connected to the semiconductor switch means (57, 58; 69, 75; 80, 81) to provide for coupling of energy stored in a respective winding and released upon disconnection or turn-OFF or blocking of a respective semiconductor switch means to the unilateral conduction means connected across the other one of the semiconductor switch means.

14. System according to claim 13, wherein the capacity value of the coupling capacitor (479 is sufficient to store energy to be returned to an energy storage device (34, 45) connected across the current supply means for return of said energy to said energy storage device.

15. System according to claim 1, wherein the strands or filaments of said windings are wound to have inductive coupling or transformer-type action therebetween;

and a coupling capacity means (47) is provided connected between said one terminals (a1, a2) of the winding strands, said inductive or transformer coupling and said capacity coupling means transferring energy stored in a respective strand or filament having current flow therein and in which current flow is then interrupted upon turn-OFF or disconnection or blocking of the respective semiconductor switch means to the other winding means and for current flow through said unilateral conduction means (59, 60, 80", 81") to return or recuperate energy stored in said filament or strand through which current is being disconnected to an energy storage means (34, 45) connected to said current supply means (33, 35).

16. An axial air gap ventilator or fan comprising the motor system of claim 1 or claim 15.

17. System according to claim 1 wherein said rotor position sensing means (25) is adapted to furnish in operation only a single binary output signal at respective different voltage levels in accordance with selected orientation with respect to position of a rotor pole, said coupling circuit means coupling said alternatingly occurring voltage levels to both said complementary semitconductor switch means to render said complementary semiconductor switch means alternatingly conductive.

18. Two-pulse two-filamentary brushless d-c motor system having
   a stator (15);
   d-c current supply means having two terminals (33, 35);
   a permanent magnet rotor (11);
   rotor position sensing means (25) providing an output signal positioned on the stator and sensing a predetermined orientation of a magnet pole of the rotor with respect to the stator;
   armature winding means including two winding strands or filaments (20, 21; 20;40 , 21') wound on the stator, said winding strands or filaments being inductively coupled;

and control circuit means connected to and controlled by said rotor position sensing means (25) including controlled semiconductor switch means (57, 58; 69, 75; 80, 81) connected to said winding strands or filaments to control pulsed current flow, alternately, through the respective winding strands or filaments;

and wherein a first winding strand (21, 21') has one terminal connected to a first terminal (35) of the current supply means through one semiconductor switch means (58, 75, 81), said one switch means being of a first conductivity type (npn), and has its other terminal connected to the other terminal (33) of the current supply means;

the second winding strand (20, 20') has one terminal connected to the other terminal (33) of the current supply means and through another semiconductor switch means (57, 69, 80), said other semiconductor switch means being of a second conductivity type (pnp), and has its other terminal connected to the first terminal (35) of the current supply means;

said winding means being tightly a-c coupled at least adjacent the terminal ends (a1, a2) connected to the respective semiconductor switch means;

the conduction of said first and second semiconductor switch means being controlled, in phase, by the rotor position sensing means (25) via said output signal therefrom;

and unilateral conduction means (59, 60; 80'', 81'') respectively connected across respective semiconductor switch means and polarized reversely with respect to the associated semiconductor switch means to recapture inductive energy stored in the respective winding strands or filaments upon turn-off of current flow therethrough during commutation of pulsed current flow as controlled by said controlled semiconductor switch means, said semiconductor switch means applying a pulse, each, for each rotor rotation of 360°-el to a respective winding strand or filament.

* * * * *